ated Feb. 10, 1970

3,495,002
ANTICARIOGENIC COMPOSITIONS COMPRISING INDIUM FLUOROZIRCONATE AND METHODS OF UTILIZING SAME
Joseph C. Muhler, Indianapolis, Ind., assignor to Indiana University Foundation, Bloomington, Ind., a nonprofit corporation
No Drawing. Original application July 19, 1966, Ser. No. 566,247, now Patent No. 3,440,004. Divided and this application Dec. 4, 1968, Ser. No. 800,016
Int. Cl. A61k 7/16
U.S. Cl. 424—52          12 Claims

ABSTRACT OF THE DISCLOSURE

A new composition of matter, namely, indium fluorozirconate, $InZrF_7$, has been discovered. This compound, when incorporated in oral compositions for dental caries prophylaxis (e.g., as a constituent of a dentifrice, prophylaxis paste, or mouthwash), has demonstrated substantial utility as an anticariogenic agent.

CROSS REFERENCE

This application is a divisional of applicant's co-pending application for United States patent, Ser. No. 566,247, filed July 19, 1966 now Patent No. 3,440,004.

This invention relates to a new compound indium fluorozirconate, $InZrF_7$, and to the use of same as an anticariogenic agent in oral compositions for caries prophylaxis.

It is commonly recognized that the presence of microquantities of fluoride in drinking water (e.g., 1.0 microgram fluoride per milliliter) has a pronounced effect in reducing the incidence of dental caries in permanent teeth of children consuming such water from birth through eight years of age. Fluoride salts have been introduced into public water supplies in many communities with good results. This method of caries prophylaxis is not available, however, to the large numbers of people whose drinking water is obtained from small, private fluoride-deficient sources such as individual wells, etc. Further, the addition of fluoride to common public water sources is not always accepted or permitted.

Topical application of aqueous fluoride solutions by dentists or dental hygienists provides an excellent measure of protection against dental caries. Various fluoride compounds have been employed in this manner, including sodium fluoride, stannous fluoride, and stannous fluorozirconate ($SnZrF_6$), which is the subject of applicant's co-pending United States patent application, Stannous Fluorozirconate and Compositions for Caries Prophylaxis Containing Same, Ser. No. 291,173, filed June 27, 1963. Another method of utilizing the anticariogenic properties of fluoride salts comprises incorporating such fluoride salts with a compatible abrasive (such as lava pumice or zirconium silicate) to form a prophylactic paste composition for use by dentists or dental hygienists in periodic cleaning and polishing of the teeth, as set forth and described in applicant's co-pending United States patent application, Prophylactic Dental Paste Compositions Comprising Zirconium Silicate, Ser. No. 314,602, filed Oct. 8, 1963.

Limitations on the availability of fluoride therapy by way of water supplies or professional treatment have led to extensive efforts to incorporate various fluoride salts in oral compositions for use in the home, most practically obtained in the form of fluoride-containing dentifrices. Again, various fluoride compounds have been employed for this purpose, especially stannous fluoride.

Although effective caries protection has been obtained through the use of the aforementioned fluoride compounds in compositions adapted for topical application to the teeth, occasional side effects have been experienced with certain of the known anticariogenic agents, partially certain tin-containing salts. For example, a brownish pigmentation of carious lesions has been experienced after anticariogenic agents containing the stannous ion have been applied to the teeth when the teeth are not properly cleaned with a toothbrush. Although the stain is not necessarily undesirable from a physiological standpoint, nevertheless, for aesthetic reasons, it would be desirable to provide an effective anticariogenic agent that does not pigment carious enamel.

The utility of certain of the prior art anticariogenic agents has been limited by the extent of their solubility in aqueous media. For example, sodium fluoride (NaF) is only soluble to the extent of about 4% in water. Solubility can, of course, limit the quantity of the anticariogenic ions provided by an agent that are available for reaction with a tooth surface. The relative insolubility of certain of the prior art anticariogenic agents limits the value of same for use in prophylactic paste compositions, since the volume of water in a prophylactic paste is necessarily limited.

Finally, certain of the known prior art anticariogenic have been relatively unstable in aqueous solution. For example, $SnF_2$ is subject to oxidation and hydrolysis and, for that reason, must be used in freshly prepared form or must be used in conjunction with complexing anions in order to obtain its optimal anticariogenic effect.

For these reasons, and others, dental researchers have continued their efforts to develop new compositions which are not only anticariogenically more effective, but which also exhibit none of the difficulties associated with certain of the prior art anticariogenic agents.

Accordingly, it is a primary object of the present invention to provide a new compound, $InZrF_7$, which exhibits a high level of anticariogenic effectiveness and which is non-toxic to living organisms at operable concentration levels.

It is a related object of the present invention to provide $InZrF_7$-containing compositions which are adapted for use in preventive dentistry.

A further object is to provide anticariogenic compositions of matter of the character described which can be used at very high concentrations relative to known anticariogenic fluoride-containing compounds.

Yet another object of the present invention is to provide an anticariogenic agent of the character described which is extremely stable in aqueous solution, even at relatively high concentrations.

A still further object of the present invention is to provide improved methods of reducing the solubility of dental enamel involving the application thereto of anticariogenic compositions containing $InZrF_7$.

These and other objects, advantages, and features of the present invention will hereinafter appear, and, for purposes of illustration, but not of limitation, exemplary embodiments of the present invention are hereinafter described in detail.

In accordance with the present invention, a new composition of matter, indium fluorozirconate, having the formula $InZrF_7$, has now been discovered. It has further been found that this new compound is highly effective as an anticariogenic agent when utilized topically (i.e., in local applications to the teeth) either alone or in combination with other materials, as hereinafter described.

FORMULATION AND CHARACTERISTICS

Indium fluorozirconate ($InZrF_7$) is a fine, white crystalline powder. The compound does not melt, but oxidizes into the respective oxides of zirconium and indium at about 700° C. At 27° C., about 50 grams of $InZrF_7$ are soluble per 100 milliliters of distilled water.

$InZrF_7$ may be prepared by co-precipitating $InF_3$ and $ZrF_4$, in accordance with the following example.

Example I 5.06 grams (0.03 mole) of chemical grade indium fluoride ($InF_3$) were placed in a polyethylene beaker and 5.0 milliliters of 48.6% hydrofluoric acid (HF) were added and mixed thoroughly therewith. 4.94 grams (0.03 mole) of zirconium tetrafluoride ($ZrF_4$) were placed in a separate polyethylene beaker, and 5.0 milliliters of 48.6% HF were added and mixed thoroughly therewith. The contents of each of these beakers were quantitatively transferred into a third clean polyethylene beaker with the aid of multiple rinsing with about 10 milliliters of redistilled water. About 25 milliliters of redistilled water were added to the resulting mixture and the contents stirred until complete solution was obtained.

The solution was then placed in an oven at 90° C. in order to remove excess water. The co-precipitate was then collected, rinsed with cold (4° C.) 95% ethanol to remove any excess HF, and the resulting white crystalline product, $InZrF_7$, was dried. 9.85 grams (about 0.03 mole) $InZrF_7$ were obtained, representing a yield of 98.5%.

Theoretical and actual chemical analyses of a typical product prepared in the foregoing manner are reported in Table I.

TABLE I.—CHEMICAL ANALYSIS

|  | Percent theoretical | Percent actual |
| --- | --- | --- |
| Indium | 33.86 | 33.4 |
| Zirconium | 26.91 | 26.4 |
| Fluorine | 39.23 | 40.2 |

The $InZrF_7$ may also be prepared by dissolving equimolar quantities of zirconium tetrachloride ($ZrCl_4$) and indium chloride ($InCl_3$) and treating the resulting mixture with an excess of 48.6% HF. The $InZrF_7$ product is then isolated by evaporation and washed with cold ethanol as described above.

The $InZrF_7$ salt of the present invention has been characterized according to the conventional Hull-Debye-Scherrer X-ray diffraction powder technique in order to produce a film record. Exposure was made using a standard X-ray diffraction camera (diameter 114.6 millimeters) for 4.0 hours at 35 kv. and 18 ma. with a copper target and a nickel filter. As is well known to one skilled in the art, this technique causes all chemical compounds to refract X-rays according to a pattern specific for each compound. The X-rays expose a film according to a specific pattern, which appears on the film as characteristic lines, the inter-planar spacing and the relative intensity of each may be measured in order to identify the compound. Table II records measurements obtained from a film record when $InZrF_7$ was treated as described, and, for comparative purposes, corresponding values obtained with $ZrF_4$ and $InF_3$. The values under $d$ are the inter-planar distances expressed in angstroms, and the values under $I$ represent the relative intensities of the lines obtained by arbitrarily assigning a value of 100 to the most intense line. The data presented in Table II show that the X-ray diffraction pattern for the novel $InZrF_7$ of the present invention are distinctive and are readily distinguishable from the patterns of $ZrF_4$ and $InF_3$.

TABLE II.—POWDER X-RAY DIFFRACTION PATTERNS OF $InZrF_7$, $InF_3$, AND $ZrF_4$

| $InZrF_7$ | | $InF_3$ | | $ZrF_4$ | |
| --- | --- | --- | --- | --- | --- |
| $dA_0$ | $I/I_0$ | $dA_0$ | $I/I_0$ | $dA_0$ | $I/I_0$ |
| 10.77 | 50 | 5.12 | 100 | 7.13 | 5 |
| 6.46 | 50 | 4.57 | 76 | 6.46 | 100 |
| 5.53 | 50 | 3.91 | 28 | 4.44 | 3 |
| 5.37 | 80 | 3.72 | 48 | 3.98 | 85 |
| 4.55 | 50 | 3.64 | 22 | 3.86 | 14 |
| 4.02 | 30 | 2.96 | 14 | 3.48 | 35 |
| 3.85 | 100 | 2.84 | 70 | 3.30 | 60 |
| 3.81 | 10 | 2.59 | 5 | 3.22 | 21 |
| 3.46 | 10 | 2.56 | 10 | 2.92 | 3 |
| 3.30 | 30 | 2.46 | 15 | 2.72 | 3 |
| 2.87 | 20 | 2.39 | 5 | 2.58 | 20 |
| 2.81 | 10 | 2.28 | 28 | 2.25 | 10 |
| 2.67 | 30 | 2.10 | 7 | 2.10 | 8 |
| 2.58 | 10 | 2.00 | 25 | 1.93 | 18 |
| 2.296 | 10 | 1.96 | 6 | 1.87 | 70 |
| 2.145 | 10 | 1.90 | 20 | 1.85 | 10 |
| 1.996 | 20 | 1.86 | 8 | 1.83 | 10 |
| 1.928 | 10 | 1.82 | 7 | 1.74 | 10 |
| 1.872 | 10 | 1.81 | 20 | 1.69 | 5 |
| 1.812 | 10 | 1.79 | 10 | 1.58 | 5 |
| 1.783 | 10 | 1.76 | 5 | | |
| 1.739 | 10 | 1.71 | 20 | | |
| | | 1.67 | 15 | | |
| | | 1.64 | 6 | | |
| | | 1.57 | 8 | | |
| | | 1.55 | 6 | | |
| | | 1.53 | 6 | | |

ANTICARIOGENIC EFFECTIVENESS

The anticariogenic effectiveness of $InZrF_7$ may be demonstrated by the dental caries experience of rats (standard experimental animals for anticariogenic studies). The effect of various compositions in reducing the solubility of dental enamel in acid is also a reliable indicator of anticariogenicity. Enamel solubility characteristics of dental compositions may be determined by a number of tests well known in the art. The particular test for reduction in tooth enamel solubility described herein comprises a comparison of acid solubility of a given tooth after an in vivo treatment with a given test composition. The comparison is expressed as "ESR," that is, enamel solubility reduction and the procedure employed is well accepted and has been described in detail previously (Buttner and Muhler, J.D. Res., 36:897, 1957).

Rat tooth ESR may be determined in vivo as follows. The teeth of a group of suitably selected test rats are given single one-minute topical applications with solutions of various fluorides, and the animals are sacrificed twenty minutes thereafter. Each mandibular hemijaw is removed, the clinical crowns of each are decalcified in 0.2 N (pH 4) sodium acetate buffer for twenty minutes, and the decalcification solutions are analyzed for phosphorus by a colorimetric method (Fisk and Subborow, "The Colorimetric Determination of Phosphorus," Journal of Biological Chemistry, 66:375, 1925). Phosphorus liberation of the teeth topically treated with the various fluoride solutions is compared with that of teeth similarly treated with distilled water control solutions, and the result of such comparison is reported as a percentage reduction of enamel solubility (i.e., ESR).

Table III reports percentage reduction values achieved in rat studies with topically applied solutions of the $InZrF_7$ salt of the present invention and two other fluoride-containing anticariogenic agents, $SnF_2$ and $InF_3 \cdot 3H_2O$ all at an 8% level. The high degree of anticariogenicity obtained through the use of the $InZrF_7$ compound of the present invention is clearly evidenced by the percentage reduction values obtained, as set forth in Table III.

TABLE III.—THE EFFECT OF A SINGLE TOPICAL APPLICATION OF THREE DIFFERENT FLUORIDE COMPOUNDS UPON ENAMEL SOLUBILITY IN THE RAT

| Treatment: | pH of Solution | ESR mean percent reduction |
|---|---|---|
| Distilled Water (control) | | |
| 8% $SnF_2$ | 2.6 | 26.6 |
| 8% $InF_3 \cdot 3H_2O$ | 2.9 | 47.3 |
| 8% $InZrF_7$ | 1.8 | 51.9 |

As has previously been noted, the $InZrF_7$ salt of the present invention is relatively more soluble than certain of the other prior art fluoride-containing anticariogenic agents. For example, the solubility limit of NaF in water is reached at about a 4% concentration, hydrated indium fluoride ($InF_3 \cdot 3H_2O$) is soluble up to about 8.5%, and $SnF_2$ is soluble up to about a 30% concentration. However, the $InZrF_7$ salt of the present invention is soluble even at a 50% level and may be employed topically at such elevated level.

ESR data obtained through the use of $InZrF_7$ topical solutions at elevated concentrations is given in Table IV. $InZrF_7$ solutions at 20%, 35%, and 50% concentration levels were applied in the previously described manner and the ESR determination made as also previously described. The data of Table IV verify that extremely high enamel solubility reduction figures are achieved with the $InZrF_7$ at elevated concentrations. However, at concentrations above about the 20% level, the ESR results are approximately equal.

TABLE IV.—THE EFFECT OF SINGLE TOPICAL APPLICATIONS OF ELEVATED CONCENTRATIONS OF $InZrF_7$ UPON ENAMEL SOLUBILITY IN THE RAT

| | Concentration, percent | Nat'l. pH | Mean percent reduction |
|---|---|---|---|
| Treatment: | | | |
| Distilled Water | | 6.7 | |
| $InZrF_7$ | 20.0 | 1.0 | 85.29 |
| $InZrF_7$ | 35.0 | 1.0 | 84.06 |
| $InZrF_7$ | 50.0 | 1.0 | 86.09 |

The effect of aqueous $InZrF_7$ solutions of different concentrations upon the enamel solubility of extracted human teeth is reported in Table V. The procedure employed has been described previously (Buttner and Muhler, J.D. Res., 37:412, 1958) and was similar to that involved in the previously described in vivo rat ESR studies, with the exception that the solution was applied to extracted human teeth. All solutions were freshly prepared and were employed at their natural pH during a four minute treatment. The data of Table V verify that extremely high enamel solubility reductions are achieved through the use of $InZrF_7$ of the present invention.

TABLE V.—THE EFFECT OF DIFFERENT CONCENTRATIONS OF $InZrF_7$ UPON THE ENAMEL SOLUBILITY OF EXTRACTED HUMAN TEETH

| | Concentration, percent | pH | Mean percent reduction |
|---|---|---|---|
| Treatment: | | | |
| $InZrF_7$ | 4.0 | 1.8 | 89.12 |
| $InZrF_7$ | 8.0 | 1.6 | 80.62 |
| $InZrF_7$ | 12.0 | 1.4 | 88.60 |
| $InZrF_7$ | 16.0 | 1.3 | 88.40 |
| $InZrF_7$ | 20.0 | 1.0 | 89.98 |

The new compound of the present invention also has outstanding utility as an anticariogenic constituent of oral compositions for caries prophylaxis. In general, such compositions (which include topical solutions, prophylactic paste compositions, and dentifrice preparations) will contain from about 0.012 to about 50% of $InZrF_7$ in accordance with the present invention. Oral compositions which are designed for relatively frequent use in the home (e.g., dentifrice and mouthwash preparations) typically contain lower levels of the salts of the present invention than do the prophylactic pastes or topical solutions. Dentifrice preparations preferably comprise from about 0.1% to about 0.5% of $InZrF_7$. Prophylactic paste compositions preferably comprise about 10 to 30% of $InZrF_7$. Topical solutions incorporating the $InZrF_7$ of the present invention preferably comprise about 0.012 to about 50% of the salt, and preferably about 4 to 20% of the salts.

Dentifrice compositions containing $InZrF_7$ constitute a preferred embodiment of this invention and may contain the usual dentifrice components, but preferably, ionically compatible adjuvants are used. For example, resinous abrasive materials including particulate condensation products of melamine and urea or formaldehyde and the like which do not form insoluble salts with fluoride ion or inactivate zirconium, indium, and fluoride ions by adsorption can be used to advantage. Other abrasives which have proven practical in fluoride containing dentifrice compositions and which can be used herein include zirconium silicate, calcium pyrophosphate, insoluble metaphosphates and alumina. Mixtures of these abrasives can also be used.

The total amount of abrasive material in dentifrices of this invention can range from 0.5% to 95% by weight of the total composition. Preferably, toothpastes contain from 20% to 60% by weight and toothpowders contain from 60% to 95% by weight.

Toothpastes require a binder substance to impart desired exture properties. Natural gum binders such as gum tragacanth, gum karaya, gum arabic, etc. and seaweed derivatives such as Irish moss and alginates, and water soluble cellulose derivatives, such as hydroxyethyl cellulose and sodium carboxymethyl cellulose can be used for this purpose. Desirably those materials are employed which are most compatible with fluoride ion. Binders which have no ionic groups, such as hydroxyethyl cellulose are especially preferred. Improvements in texture can also be attained by including an additional material such as colloidal magnesium aluminum silicate.

Thickening agents in an amount of from 0.5% to 5.0% by weight can be used to form a satisfactory toothpaste.

Toothpastes conventionally contain sudsing agents. Suitable sudsing agents include, but are not limited to, water-soluble alkyl sulfates having from 8 to 18 carbon atoms in the alkyl radical, such as sodium lauryl sulfate, water-soluble salts of sulfonated monoglycerides of fatty acids having from 10 to 18 carbon atoms in the alkyl radical such as soduim coconut monoglyceride sulfonate, salts of fatty acid amides of taurines such as sodium-N-methyl palmitoyl tauride, and salts of fatty acid esters of isethionic acid.

Sudsing agents can be used in the composition of this invention in an amount of from about 0.5% to about 5.0% by weight of the total composition.

It is also desirable to include some humectant material in a toothpaste to keep it from hardening. Materials commonly used for this purpose include glycerine, sorbitol and other polyhydric alcohols. The humectants can comprise up to 35% of the toothpaste composition.

Flavoring materials may be included in toothpaste formulations including small amounts of oils of wintergreen and peppermint and sweetening agents such as saccharin, dextrose and levulose.

The following examples provide exemplary dentifrice formulations comprising the $InZrF_7$ salt of the present invention.

Example II

| Constituent: | Percent by weight |
|---|---|
| ZrSiO$_4$ | 10.34 |
| Mg$_3$Si$_4$O$_{10}$(OH)$_2$ | 31.02 |
| InZrF$_7$ | 0.25 |
| Victamide [1] | 13.03 |
| Distilled water | 12.48 |
| Glycerin | 10.83 |
| Sorbitol (70% aqueous solution) | 11.12 |
| Sodium lauryl sulfate | 1.98 |
| Sodium carboxymethyl cellulose | 1.03 |
| m-HPO$_3$ | 4.13 |
| Potassium H phthalate | 2.27 |
| Saccharin | 0.53 |
| Coloring agents | 0.16 |
| Flavoring agents | 0.82 |

[1] An ammonium salt of a condensation product of NH$_3$ and P$_4$O$_{10}$ commercially available from the Victor Chemical Company under the trademark "Victamide," e.g.,

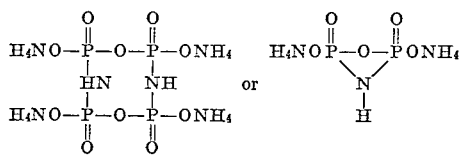

When diluted with water and brushed upon the teeth in the conventional manner, this toothpaste markedly reduces the solubility of the dental enamel.

EXAMPLE III

| Constituent: | Percent by weight |
|---|---|
| Calcium pyrophosphate | 39.00 |
| InZrF$_7$ | 0.25 |
| Water | 26.32 |
| Glycerine | 10.00 |
| Sorbitol (70% aqueous solution) | 20.00 |
| Sodium coconut monoglyceride sulfonate | 0.80 |
| Sodium coconut alkyl sulfate | 0.70 |
| Hydroxyethylcellulose | 1.50 |
| Magnesium aluminum silicate | 0.40 |
| Saccharin | 0.18 |
| Flavoring agents | 0.85 |

This formulation is effective in caries prophylaxis and has good flavor, texture, and foaming characteristics.

As hereinbefore stated, InZrF$_7$ also exhibits utility as an anticariogenic agent when incorporated with a cleaning and polishing agent (e.g., lava pumice or zirconium silicate) to form a pryophylactic paste composition adapted for application once or twice a year by a dentist or dental hygienist (or on a self-administered home use basis). Preferred prophylactic pastes embodying zirconium silicate are set forth and described in applicant's co-pending United States patent application entitled Prophylactic Dental Paste Compositions Comprising Zirconium Silicate, Ser. No. 314,602, filed Oct. 8, 1963.

Table VI contains representative in vivo rat ESR results obtained through the use of various prophylactic paste compositions. A suitable number of test rats were divided into groups and each group was given a 15 second prophylaxis with one of the compositions. Twenty minutes following treatment, the animals were sacrificed, and enamel solubilities were determined in the previously described manner. The data of Table VI illustrate the high level of anticariogenic effectiveness obtained with prophylactic paste compositions embodying the InZrF$_7$ salt of the present invention at several concentrations.

TABLE VI.—THE EFFECT OF SINGLE APPLICATIONS OF VARIOUS PROPHYLACTIC PASTES UPON ENAMEL SOLUBILITY IN THE RAT

| Prophylactic Paste Constituents, Percent | | | ESR Data, mean percent reduction |
|---|---|---|---|
| Fluoride, percent | Abrasive, percent | Water, percent | |
| InZrF$_7$, 8 | ZrSiO$_4$, 80 | 12 | 49.0 |
| InZrF$_7$, 10 | ZrSiO$_4$, 75 | 15 | 73.43 |
| InZrF$_7$, 20 | ZrSiO$_4$, 65 | 15 | 81.96 |
| InZrF$_7$, 30 | ZrSIO$_4$, 15 | 15 | 86.90 |
| InZrF$_7$, 40 | ZrSiO$_4$, 35 | 25 | 78.57 |
| InZr$_7$, 50 | ZrSIo$_4$, 25 | 26 | 83.07 |

ANIMAL TOXICITY

In addition to exhibiting a high level of anticariogenic effectiveness, the InZrF$_7$ salt of the present invention may be safely utilized in animal organisms without any dangerous side effects. The toxicity of InZrF$_7$ compares quite favorably with that of other anticariogenic fluorides, as shown by the following experimental studies.

The toxicity of the InZrF$_7$ salt has been determined in mice (standard experimental animals for this purpose), and acute toxicity data are given in Table VII. The toxicity is expressed in terms of an LD$_{50}$, which is the lethal dose for 50% of the animals treated.

TABLE VII.—ACUTE TOXICITY

| Dosage (mg. F as InZrF$_7$/Kg. Body Wt.) | No of animals | Percent mortality |
|---|---|---|
| 60 | 6 | 0.0 |
| 70 | 18 | 22.2 |
| 80 | 18 | 33.3 |
| 90 | 24 | 37.5 |
| 92.5 | 30 | 46.7 |
| 95 | 12 | 66.7 |
| 100 | 20 | 80.0 |
| 110 | 12 | 83.3 |
| 120 | 8 | 87.5 |
| 130 | 6 | 100.0 |

Based on the data of Table VII, it would appear that the acute LD$_{50}$ of InZrF$_7$ is about 93 mg. fluoride/kilogram body weight. In comparison, the acute LD$_{50}$ value for sodium fluoride is 36 mg. F/kg. body weight.

InZrF$_7$ may be employed in the compositions of this invention even in high concentration (e.g., as high as about 50%), without producing any adverse soft tissue reactions. In contrast, prior art fluoride compounds such as SnF$_2$ and SnZrF$_6$ may not be employed at concentration levels greater than about 15% and 20% respectively. InZrF$_7$ is completely free of any tissue reaction at any concentration, whereas with SnF$_2$, even at only an 8% level, a mild gingival sloughing is experienced in many instances where tissue inflammation is present at the time of treatment.

InZrF$_7$ is stable in aqueous solution for periods of time up to at least 30 days in marked contrast to the prior art agents containing the easily oxidized or hydrolyzed stannous ion. Thus, in contrast to such prior art compounds, InZrF$_7$ aqueous solutions need not be freshly prepared immediately prior to use. Moreover, when employed as a topical anticariogenic agent, InZrF$_7$ produces no unsightly pigmentation (such as the brown phosphate pigmentation produced at the site of a carious lesion when a stannous ion-containing anticariogenic agent is employed).

While the present invention has been described herein with reference to certain exemplary embodiments thereof, it should be understood that various changes, modifications, and alterations may be effected in the materials utilized, in the proportions of materials, and in the manners of formulation without departing from the spirit and the scope of the present invention, as defined in the appended claims.

What is claimed is:

1. Oral compositions for dental caries prophylaxis comprising from about 0.012 to 50% indium fluorozirconate, $InZrF_7$, by weight and a carrier suitable for use in the oral cavity.

2. An oral composition, as claimed in claim 1, and adapted for use as a dentifrice preparation, wherein the $InZrF_7$ is present at a level of from about 0.10 to 0.50%.

3. A dentifrice preparation, as claimed in claim 2, and further comprising about 20 to 60% of a fluoride-compatible cleaning and polishing agent.

4. An oral composition, as claimed in claim 1, and adapted for use as a prophylactic paste, wherein $InZrF_7$ is present at a level of from about 10 to 30%.

5. A prophylactic paste, as claimed in claim 4, and further comprising about 30 to 80% of a fluoride-compatible cleaning and polishing agent.

6. An oral composition, as claimed in claim 1, and adapted for direct topical application to the teeth in aqueous solution form, wherein the $InZrF_7$ is present at a level of from about 0.012 to 50%.

7. A method for increasing the dental caries resistance of teeth comprising the application thereto of an oral composition comprising from about 0.012 to 50% indium fluorozirconate, $InZrF_7$, by weight, and a carrier suitable for use in the oral cavity.

8. A method, as claimed in claim 7, wherein the composition is a dentifrice preparation comprising from about 0.12 to 0.50% $InZrF_7$.

9. A method, as claimed in claim 8, wherein the composition further comprises about 20 to 70% of a fluoride-compatible cleaning and polishing agent.

10. A method, as claimed in claim 7, wherein the composition is a prophylactic paste comprising from about 10 to 30% $InZrF_7$.

11. A method, as claimed in claim 10, wherein the composition further comprises about 30 to 80% of a fluoride-compatible cleaning and polishing agent.

12. A method, as claimed in claim 7, wherein the composition is an aqueous solution comprising about 0.012 to 50% $InZrF_7$.

No references cited.

RICHARD L. HUFF, Primary Examiner

U.S. Cl. X.R.

424—54, 57